J. G. PERRY.
Sausage Machine.
No. 28,298.
Patented May 15, 1860.
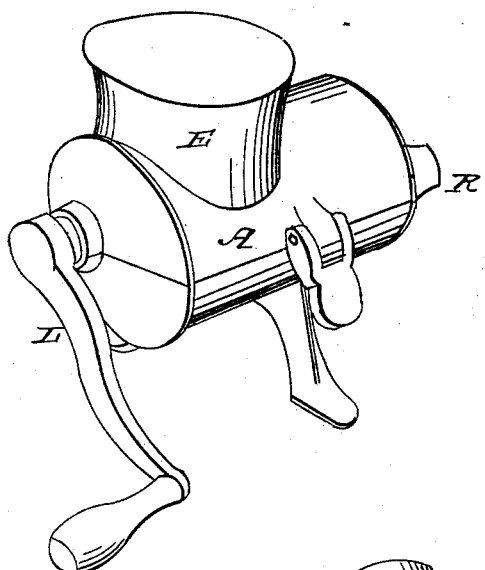
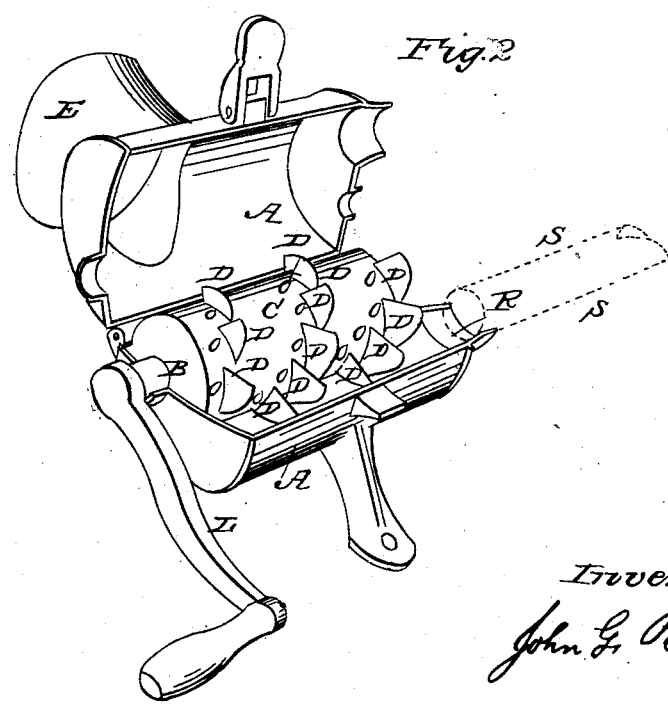
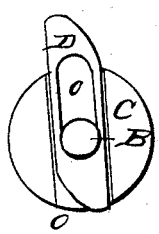
Witnesses
Inventor
John G. Perry

UNITED STATES PATENT OFFICE.

JOHN G. PERRY, OF SOUTH KINGSTON, RHODE ISLAND.

SAUSAGE-MACHINE.

Specification of Letters Patent No. 28,298, dated May 15, 1860.

*To all whom it may concern:*

Be it known that I, JOHN G. PERRY, of South Kingston, in the county of Washington, in the State of Rhode Island, have invented a new and Improved Machine for Cutting Meat for Sausages and other Purposes and for Filling the Same into the Cases; and I do hereby declare that the following is a full and correct description thereof, reference being had to the accompanying drawings, and to the letters of reference marked thereon.

The same letters in the different figures denote similar parts.

In these drawings Figure 1 is a view in perspective of the machine. Fig. 2 is the same, open, showing the arrangement of the knives &c. Fig. 3 is a cross section of the cylinder through one of the knife recesses. Fig. 4 represents the tube, or nozzle, for holding the cases when the machine is used as a filler.

To construct this machine, make a case A, divided into an upper and lower part, substantially as shown in the accompanying drawings Figs. 1 and 2. The shaft B, is placed across the case, and turns in bearings at each end; upon this shaft is a cylinder C, which may be of one piece with the shaft, or made of several pieces, as may be preferred. This cylinder C, has recesses o o o made in it, running through it from one side to the other, and placed spirally, from one end of the cylinder to the other; that is, from the end under the hopper (E), toward the discharging end, each succeeding recess is placed a little back of each preceding one, on the cylinder; these recesses are for the knives to slide in, see Fig. 3. The cylinder C, is brought nearer to one side of the case than the other, by placing the shaft B, eccentric to the cavity of the case, for the purpose of causing the knives D D, to slide through their recesses, by bringing their ends against the side of the case; and for the purpose of holding the meat, to receive the action of the knives. The knives which are long enough to reach nearly across the cavity of the case, are made to about fill the recesses, and slide in them easily; and are sharpened on each side near the ends.

At R, an aperture is made for discharging the meat when cut; and when the machine is used as a sausage filler, the tube F, is put into this opening R, as shown in Fig. 2, by the dotted lines S S; and the knives may be recessed, so as to bring their backs in front, to drive the meat. Upon one end of the shaft is a crank L, to operate the machine by, and a hopper E, to receive the meat, is placed on the top of the machine at one end.

The operation of the machine as a meat cutter, may be described as follows: motion being given to the cylinder by means of the crank; the meat is put into the hopper, and is carried down into the case by the knives, and around under the cylinder, when it stops in consequence of the case, and cylinder, coming too near together to allow of its passing further; and the knives are forced through it, at the same time that they are pushed up through their recesses in the cylinder; thus by these two motions of the knives, forward, and upward, a drawing cut is made through the meat, with great advantage and facility. The meat while being cut, is carried toward the other end of the machine, by reason of the knives being placed in a spiral position, and is finally pushed out at the aperture R.

The operation of the machine as a sausage filler is as follows: The tube F being placed in the aperture R, and the cases placed upon it, motion is given to the cylinder, by one hand, and the meat is fed into the machine through the hopper by the other, and being prevented from going around with the cylinder, by the proximity of the case upon one side, it is pushed toward the end where it is to be discharged, out through the tube or nozzle F into the cases placed upon them.

Thus having described my machine what I claim as my invention and desire to secure by Letters Patent is—

The combination of the sliding knives D, with the cylinder C, substantially as herein described, and for the purposes set forth.

JOHN G. PERRY.

Witnesses:
WM. H. PERRY,
H. P. CLARKE.